US012528476B2

(12) United States Patent
Mitsumoto et al.

(10) Patent No.: US 12,528,476 B2
(45) Date of Patent: Jan. 20, 2026

(54) VEHICLE BEHAVIOR CONTROL METHOD AND VEHICLE BEHAVIOR CONTROL DEVICE

(71) Applicant: TOYOTA JIDOSHA KABUSHIKI KAISHA, Toyota (JP)

(72) Inventors: Hisanori Mitsumoto, Hadano (JP); Sota Ukai, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 229 days.

(21) Appl. No.: 18/364,688

(22) Filed: Aug. 3, 2023

(65) Prior Publication Data

US 2024/0109547 A1 Apr. 4, 2024

(30) Foreign Application Priority Data

Sep. 28, 2022 (JP) .................................. 2022-155376

(51) Int. Cl.
  *B60W 40/114* (2012.01)
  *B60W 40/107* (2012.01)
  *B60W 40/109* (2012.01)
  *B60W 50/00* (2006.01)

(52) U.S. Cl.
  CPC ........ *B60W 40/114* (2013.01); *B60W 40/107* (2013.01); *B60W 40/109* (2013.01); *B60W 2050/0026* (2013.01); *B60W 2710/18* (2013.01)

(58) Field of Classification Search
  CPC ............ B60W 40/114; B60W 40/107; B60W 40/109; B60W 2050/0026; B60W 2710/18
  See application file for complete search history.

(56) References Cited

U.S. PATENT DOCUMENTS

| | | | |
|---|---|---|---|
| 2005/0075771 A1 | 4/2005 | Matsuno | |
| 2016/0059852 A1* | 3/2016 | Yamakado | B60W 30/045 701/41 |

FOREIGN PATENT DOCUMENTS

| | | |
|---|---|---|
| JP | 4657594 B2 | 3/2011 |
| JP | 2023-044346 A | 3/2023 |

* cited by examiner

*Primary Examiner* — Wade Miles
*Assistant Examiner* — Jerrod Irvin Davis
(74) *Attorney, Agent, or Firm* — Sughrue Mion, PLLC

(57) ABSTRACT

A difference in a longitudinal force indicating a difference between the longitudinal force acting on left and right wheels is obtained. A correction amount of the longitudinal force acting on each wheel is calculated based on the difference in the longitudinal force, and each wheel is independently controlled. When the difference in the longitudinal force is obtained, a speed increasing ratio of a front wheel steering angle for changing an overall steering ratio is calculated based on a preset control map and an input parameter including a vehicle speed and a lateral acceleration or the vehicle speed and steering wheel angle. A yaw moment to be generated around a weighted center of the vehicle is calculated based on the speed increasing ratio and a steering wheel angle of the vehicle as the input parameter. The difference in the longitudinal force is then calculated based on this yaw moment.

8 Claims, 11 Drawing Sheets

VEHICLE BEHAVIOR CONTROL METHOD AND VEHICLE BEHAVIOR CONTROL DEVICE

CROSS-REFERENCE TO RELATED APPLICATION

The present application claims priority under 35 U.S.C. § 119 to Japanese Patent Application No. 2022-155376, filed on Sep. 28, 2022, the contents of which application are incorporated herein by reference in their entirety.

TECHNICAL FIELD

The present disclosure relates to a method and a device for controlling behavior of a vehicle.

BACKGROUND

JP4657594B discloses a device for controlling a behavior of a vehicle by variably controlling a driving force between front and rear wheels. The device of the related art calculates a yaw moment required for controlling the behavior of the vehicle and calculates a control amount to which the yaw moment is added. The device of the related art also corrects the value of the yaw moment based on a difference between reference lateral acceleration and actual lateral acceleration. The reference lateral acceleration is calculated based on lateral acceleration calculated based on an operating state of the vehicle and a coefficient that is set according to state quantities such as steering wheel angle, vehicle speed, yaw rate, and the lateral acceleration.

In general, in a scene where the lateral acceleration of the vehicle is large, a local yaw rate gain (which refers to a change in yaw rate with respect to a local change in the steering wheel angle, hereinafter, also referred to as an "effectiveness of a rudder") decreases compared to a scene in which the lateral acceleration of the vehicle is small. Therefore, it is desirable to control the behavior of the vehicle so as to suppress a decrease in the effectiveness of the rudder not only in the scene in which the lateral acceleration of the vehicle is small but also in the scene in which the lateral acceleration is large.

According to the device of the related art, a driving force between front and rear wheels is variably controlled based on the control amount to which the yaw moment required for controlling the behavior of the vehicle is added. Therefore, this control method is considered to be an effective technique for suppressing the decrease in the effectiveness of the rudder. However, in the control method, information of all state quantities is required for the calculation of the reference lateral acceleration. In addition, the control method uses a feedback configuration in which the difference between the reference lateral acceleration and the actual lateral acceleration to correct the value of the yaw moment. Therefore, if the presence or absence of disturbance on road surfaces is not taken into consideration, an accuracy of the control amount to which the yaw moment is added may decrease, and the decrease in the effectiveness of the rudder may not be suppressed.

SUMMARY

An object of the present disclosure is to provide a technique capable of suppressing the decrease in the effectiveness of the rudder not only in the scene in which the lateral acceleration of the vehicle is small but also in the scene in which the lateral acceleration is large.

A first aspect of the present disclosure is a method for controlling a behavior of a vehicle, and has the following features.

The method comprises the steps of: obtaining a difference in a longitudinal force indicating a difference between the longitudinal force acting on left wheels and the longitudinal force acting on right wheels based on an input parameter; and calculating a correction amount of the longitudinal force acting on each wheel based on the difference in the longitudinal force to independently control each wheel.

The step of obtaining the difference in the longitudinal force comprises the steps of: calculating a speed increasing ratio of front wheel steering angle for changing an overall steering ratio based on a preset control map and the speed and lateral acceleration of the vehicle or the speed and steering wheel angle of the vehicle as the input parameter; calculating a yaw moment to be generated around a weighted center of the vehicle based on the speed increasing ratio and the steering wheel angle of the vehicle as the input parameter; and calculating the difference in the longitudinal force based on the yaw moment.

A second aspect of the present disclosure is a device for controlling behavior of a vehicle and has the following features.

The device comprises a processor and a memory in which a control program is stored.

When the control program is executed, the processor is configured to: obtain a difference in a longitudinal force indicating a difference between the longitudinal force acting on left wheels and the longitudinal force acting on right wheels based on an input parameter; and calculate a correction amount of the longitudinal force acting on each wheel based on the difference in the longitudinal force to independently control each wheel.

In the processing to obtain the difference in the longitudinal force, the processor is configured to: calculate a speed increasing ratio of front wheel steering angle for changing an overall steering ratio based on a preset control map and the speed and lateral acceleration of the vehicle, or based on the preset control map and the speed and steering wheel angle of the vehicle as the input parameter; calculate a yaw moment to be generated around a weighted center of the vehicle based on the speed increasing ratio and the steering wheel angle of the vehicle as the input parameter; and calculate the difference in the longitudinal force based on the yaw moment.

According to the present disclosure, the yaw moment to be generated around the weighted center of the vehicle is calculated based on the steering wheel angle and the speed increasing ratio of the front wheel steering angle calculated based on the preset control map. Further, the correction amount of the longitudinal force acting on each wheel is calculated based on the difference in the longitudinal force calculated based on the calculated yaw moment, and each wheel is independently controlled. As shown in the verification result described below, according to the present disclosure, it is possible to suppress the decrease in the effectiveness of the rudder in a wide lateral acceleration region.

DESCRIPTION OF EMBODIMENT

Figure 1:
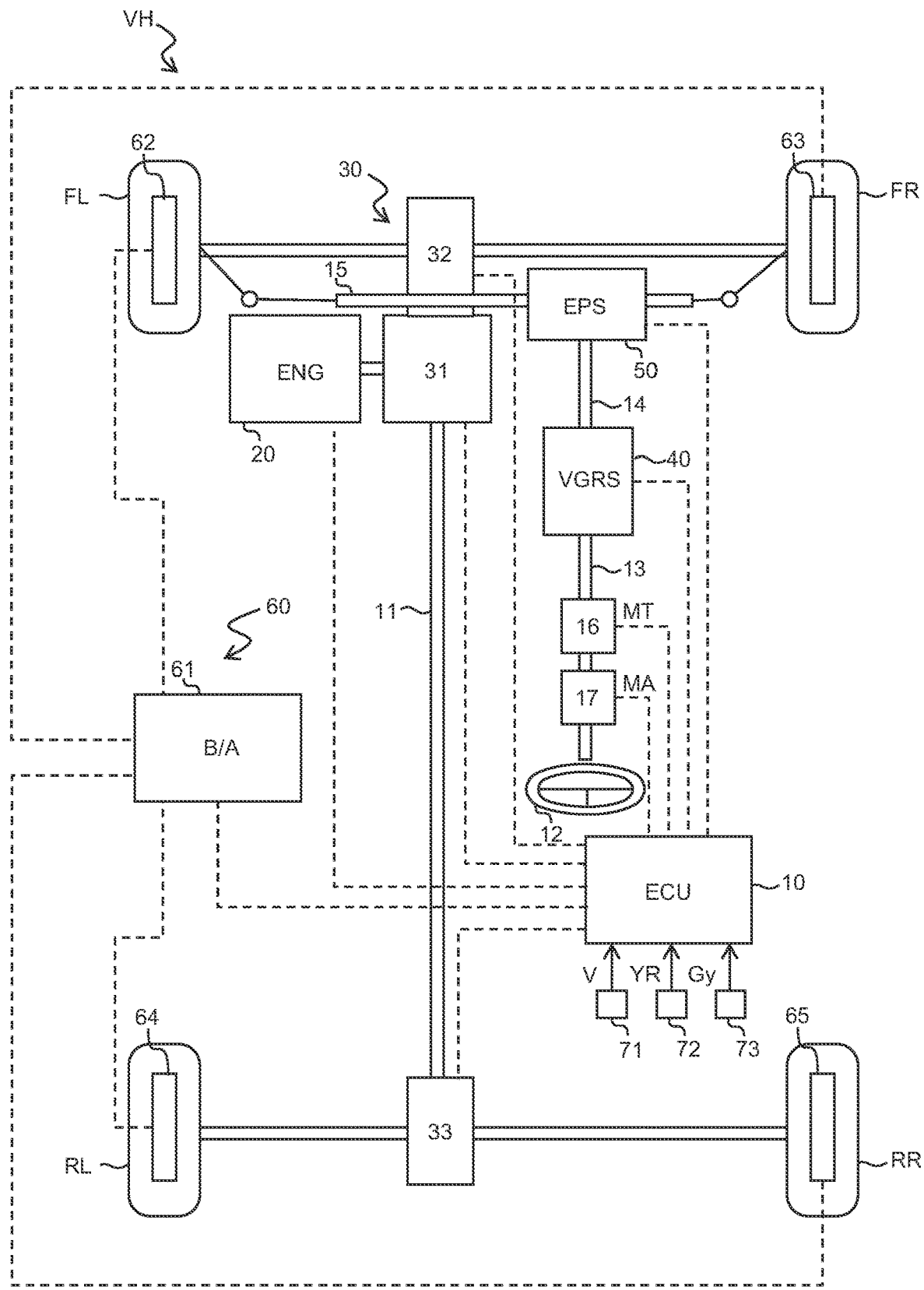
FIG. 1 is a diagram illustrating a configuration example of a vehicle on which a device according to an embodiment is mounted.

Hereinafter, a method and device for controlling behavior of a vehicle according to an embodiment of the present disclosure will be described with reference to the accompanying drawings. In the drawings, the same or corresponding parts are denoted by the same reference numerals, and the description thereof will be simplified or omitted.

1. Configuration Example of Vehicle

FIG. 1 is a diagram illustrating a configuration example of a vehicle on which a device according to the embodiment is mounted. FIG. 1 shows a vehicle VH that is a four-wheel vehicle including a left front wheel FL, a right front wheel FR, a left rear wheel RL and a right rear wheel RR. The vehicle VH travels in a desired direction by steering angle changes of the left front wheel FL and the right front wheel FR which are steering wheels, and the steering angle changes of the left rear wheel RL and the right rear wheel RR.

In the example shown in FIG. 1, the vehicle VH includes, in addition to the above-described four wheels, an ECU (Electronic Controlled Unit) 10, an engine (ENG) 20, a driving force distribution unit 30, a VGRS (Variable Gear Ratio Steering) actuator 40, an EPS (Electronic Power Steering) actuator 50, and an ECB (Electronic Controlled Braking system) 60.

The ECU 10 is a controller that includes at least one processor and at least one memory. The at least one processor includes a central processing unit (CPU). The at least one memory includes a read only memory (ROM) and a random-access memory (RAM). The ECU 10 executes various processing in accordance with a control program stored in the memory (for example, the ROM). The various processing includes processing to control a behavior of the vehicle VH. The ECU 10 may be composed of a plurality of ECUs. The control program may be stored in a computer-readable recording medium.

The engine 20 is an example of a power source of the vehicle VH. The power source of the vehicle VH may be a rotary electric machine such as a motor, or may be the engine 20 and the rotary electric machine. The vehicle VH in the former case is an electronic vehicle, and the vehicle VH in the latter case is a so-called hybrid vehicle. A crankshaft which is a driving force output shaft of the engine 20 is connected to a center differential device 31 included in the driving force distribution unit 30.

The driving force distribution unit 30 is configured to distribute an engine torque Te transmitted from the engine 20 via the crankshaft to the front wheels and the rear wheels at a predetermined ratio. The driving force distribution unit 30 is also configured to be able to change a distribution ratio of the driving force between the left wheel and the right wheel in each of the front wheel and the rear wheel. The driving force distribution unit 30 includes a front differential device 32 and a rear differential device 33 in addition to the above-described center differential device 31. Hereinafter, for convenience of description, the center differential device 31 is also referred to as a "center-diff 31", the front differential device 32 is also referred to as a "front-diff 32", and the rear differential device 33 is also referred to as a "rear-diff 33".

The center-diff 31 distributes the engine torque Te supplied from the engine 20 to the front-diff 32 and the rear-diff 33. The center-diff 31 distributes the engine torque Te to the front and rear wheels at a predetermined distribution ratio (e.g., 50:50) under a condition where an load acting on the front and rear wheels is substantially constant. The center-diff 31 is composed of, for example, a distribution ratio variable type differential mechanism that performs a differential action by a planetary gear mechanism, continuously changes a differential limiting torque by on-off control of an electromagnetic clutch, and can realize a desired distribution ratio within a predetermined adjustment range. The center-diff 31 may have various configurations as long as the engine torque Te can be distributed to the front wheels and the rear wheels.

The front-diff 32 is constituted by, for example, a distribution ratio variable type differential mechanism capable of distributing the engine torque Te distributed to a front wheel axle side by the center-diff 31 to the left and right wheels at a desired distribution ratio set within a predetermined adjustment range. The front-diff 32 includes, for example, a planetary gear mechanism including a ring gear, a sun gear, and a pinion carrier, and an electromagnetic clutch for applying differential limiting torque, and has a configuration in which a differential case is connected to the ring gear of the planetary gear mechanism, and left and right axles are connected to the sun gear and the carrier, respectively. The differential limiting torque is continuously controlled by energization control for the electromagnetic clutch, and the distribution ratio of the torque is continuously variably controlled within a predetermined adjustment range determined by the physical and electrical configuration of the front-diff 32.

The front-diff 32 is electrically connected to the ECU 10, and the energization control for the electromagnetic clutch is also controlled by the ECU 10. Accordingly, the ECU 10 can generate a predetermined driving force difference between the left and right front wheels through the drive control of the front-diff 32. It should be noted that the configuration of the front-diff 32 is not limited to the one exemplified here and may have various aspects as long as the driving force (the torque and the driving force are in a unique relationship) can be distributed to the left and right front wheels at the desired distribution ratio.

The rear-diff 33 is constituted by, for example, a distribution ratio variable type differential mechanism capable of distributing the engine torque Te distributed to a rear wheel axle side via the propeller shaft 11 by the center-diff 31 to the left and right wheels at a desired distribution ratio set within a predetermined adjustment range. The rear-diff 33 includes a planetary gear mechanism including a ring gear, a sun gear, and a pinion carrier, and an electromagnetic clutch for applying differential limiting torque, and adopts a configuration in which a differential case is connected to the ring gear of the planetary gear mechanism, and left and right axles are connected to the sun gear and the carrier, respectively. The differential limiting torque is continuously controlled by energization control for the electromagnetic clutch, and the distribution ratio of the torque is continuously variably controlled within a predetermined adjustment range determined by the physical and electrical configuration of the rear-diff 33.

The rear-diff 33 is electrically connected to the ECU 10, and the energization control for the electromagnetic clutch is also controlled by the ECU 10. Therefore, the ECU 10 can generate a predetermined driving force difference between the left and right rear wheels through the drive control of rear-diff 33. It should be noted that the configuration of the rear-diff 33 is not limited to the one exemplified here and may have various aspects as long as the driving force (the torque and the driving force have a unique relationship) can be distributed to the left and right rear wheels at a desired distribution ratio.

The VGRS actuator 40 is, for example, a steering transmission ratio variable device including a housing, a VGRS motor, a deceleration mechanism, and a lock mechanism (none of which are shown). The VGRS motor, the deceleration mechanism and the locking mechanism are accommodated in the housing. This housing is fixed to a downstream end of the upper steering shaft 13 connected to the steering wheel 12 operated by a driver of the vehicle VH. The housing is also configured to be rotatable substantially integrally with the upper steering shaft 13.

The VGRS motor is, for example, a DC brushless motor including a rotor as a rotor element, a stator as a stator element, and a rotating shaft as a driving force outputting shaft. The stator is supplied with a drive voltage from an electric drive circuit (not shown). The stator is fixed inside the housing. The rotor is rotatably held within the housing. The rotary shaft is fixed so as to be coaxially rotatable with the rotor, and a downstream end of the rotary shaft is coupled to the deceleration mechanism.

The deceleration mechanism is a planetary gear mechanism having a plurality of rotating elements capable of differential rotation. One of the plurality of rotary elements is coupled to the rotary shaft of the VGRS motor, and one of the other rotary elements is coupled to the housing of the VGRS motor. The rest of the other rotating elements are connected to the lower steering shaft 14.

According to the deceleration mechanism having such a configuration, the rotation speed of the lower steering shaft 14 connected to the remaining one rotation element is uniquely determined by the rotation speed of the upper steering shaft 13 (i.e., the rotation speed of the housing) according to the operation amount of the handle 12 and the rotation speed of the VGRS motor (i.e., the rotation speed of the rotation shaft). At this time, the rotational speed of the lower steering shaft 14 can be controlled to increase or decrease by controlling the rotational speed of the VGRS motor to increase or decrease by the differential action between the rotating elements. That is, the upper steering shaft 13 and the lower steering shaft 14 are rotatable relative to each other by the action of the VGRS motor and the deceleration mechanism. Due to each configuration of the rotating elements in the deceleration mechanism, the rotational speed of the VGRS motor is transmitted to the lower steering shaft 14 in a state of being reduced in accordance with a predetermined reduction ratio determined in accordance with the gear ratio between the rotating elements.

Thus, in the vehicle VH, the upper steering shaft 13 and the lower steering shaft 14 are rotatable relative to each other, such that a steering transmission ratio (an overall steering ratio or a steering gear ratio) is continuously variable within a predetermined range. The steering transmission ratio is a ratio between the steering angle, which is a rotation amount of the upper steering shaft 13, and the front wheel steering angle, which is uniquely determined according to the rotation amount of the lower steering shaft 14 (also related to the gear ratio of the rack and pinion mechanism described later).

The lock mechanism is a clutch mechanism including a clutch element on the VGRS motor end and a clutch element on the housing end. In a state where these clutch elements are engaged with each other, the rotational speeds of the upper steering shaft 13 and the rotating shaft of the VGRS motor coincide with each other, so that the rotational speed of the lower steering shaft 14 inevitably coincides with these rotational speeds. That is, the upper steering shaft 13 and the lower steering shaft 14 are directly connected to each other.

The VGRS actuator 40 is electrically connected to the ECU 10, and the operation thereof is controlled by the ECU 10.

In the vehicle VH, the rotation of the lower steering shaft 14 is transmitted to the rack and pinion mechanism. The rack and pinion mechanism is a steering transmission mechanism including a pinion gear connected to the downstream end of the lower steering shaft 14 and a rack bar 15 formed with gear teeth meshing with the gear teeth of the pinion gear. As the rotation of the pinion gear is converted into the motion of the rack bar 15 in the horizontal direction in the drawing, the steering force is transmitted to each wheel through a tie rod and a knuckle (sign is omitted) connected to both ends of the rack bar 15.

The EPS actuator 50 is, for example, a steering torque assisting device including an EPS motor as a DC brushless motor including a rotor having permanent magnets and a stator surrounding the rotor. In the EPS motor, the rotor is rotated by an action of a rotating magnetic field formed in the EPS motor by energization of the stator via an electric driving device, thereby generating an EPS torque in a rotation direction thereof.

A reduction gear is fixed to a motor shaft which is a rotation shaft of the EPS motor. This reduction gear meshes directly or indirectly with a reduction gear provided on the lower steering shaft 14. Therefore, in the present embodiment, the EPS torque generated from the EPS motor functions as a torque for assisting the rotation of the lower steering shaft 14. Therefore, when the EPS torque is applied in the same direction as the driver steering torque MT applied to the upper steering shaft 13 via the steering wheel 12, a steering burden on the driver is reduced by the EPS torque.

Note that the VGRS actuator 40 and the EPS actuator 50 may be configured as an actuator integrated with each other.

The vehicle VH is provided with a steering angle sensor 16 and a steering torque sensor 17. The steering angle sensor 16 detects a steering wheel angle MA indicating a rotation amount of the upper steering shaft 13. The steering torque sensor 17 detects a driver steering torque MT applied from the driver via the steering wheel 12. The steering wheel angle MA and the driver steering torque MT are referred to by the ECU 10 in constant or variable cycles.

The ECB 60 is an electronically controlled braking device that individually applies a braking force to the left front wheel FL, the right front wheel FR, the left rear wheel RL, and the right rear wheel RR. The ECB 60 includes a brake actuator (B/A) 61 and braking devices 62, 63, 64 and 65 corresponding to the left front wheel FL, the right front wheel FR, the left rear wheel RL and the right rear wheel RR, respectively.

For example, the brake actuator 61 individually supplies hydraulic fluid to the braking devices 62, 63, 64, and 65. The brake actuator 61 includes a master cylinder, an electric oil pump, a plurality of hydraulic transmission paths, solenoid valves provided in the respective hydraulic transmission paths, and the like. The brake actuator 61 individually controls the hydraulic pressure of the hydraulic oil supplied to the wheel cylinder of each braking device by controlling an open/close state of a solenoid valve. The hydraulic pressure of the hydraulic oil is in a one-to-one relationship with the pressing force of the brake pad provided in each braking device, and the magnitude of the hydraulic pressure corresponds to the magnitude of the braking force in each braking device.

The brake actuator 61 is electrically connected to the ECU 10, and the braking force applied from each braking device to each wheel is controlled by the ECU 10. Therefore, the ECU 10 can generate a predetermined braking force difference between the left and right front wheels and between the left and right rear wheels through the control of the brake actuator 61.

The vehicle VH is also provided with a vehicle speed sensor 71, a yaw rate sensor 72, and a lateral acceleration sensor 73. The vehicle speed sensor 71 detects a vehicle speed V which is a speed of the vehicle VH. The yaw rate sensor 72 detects a yaw rate YR generated in the vehicle VH. The lateral acceleration sensor 73 detects a lateral acceleration Gy acting on the vehicle VH. The lateral acceleration Gy may be estimated by the steering wheel angle MA and the vehicle speed V (Gy=MA*V). The vehicle speed V, the yaw rate YR and the lateral acceleration Gy are referred to by the ECU 10 in constant or variable cycles.

2. Features of Embodiment

2-1. Vehicle Behavior Control Based on Longitudinal Force

As described with reference to FIG. 1, the vehicle VH is configured to independently apply the driving force and the braking force to the left front wheel FL, the right front wheel FR, the left rear wheel RL, and the right rear wheel RR by being controlled by the ECU 10. Here, the driving force and the braking force applied to each wheel of the vehicle VH can be expressed as a "longitudinal force" acting on each wheel.

Figure 2:
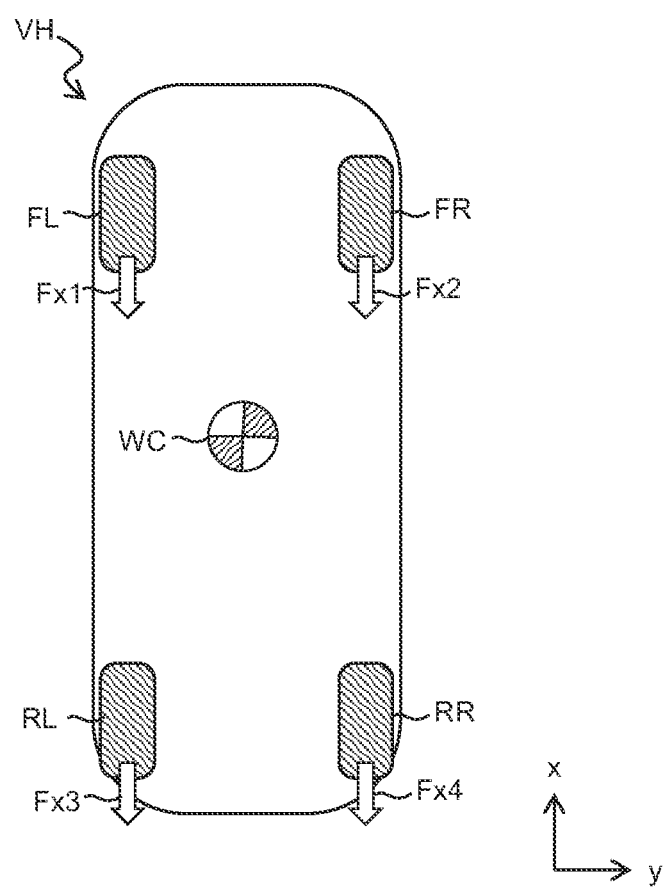
FIG. 2 is a diagram illustrating a longitudinal force acting on each wheel of the vehicle.

FIG. 2 is a diagram illustrating the longitudinal force acting on each wheel of the vehicle VH. The longitudinal force when the vehicle VH is driving indicates a positive value, and the longitudinal force when the vehicle VH is braking indicates a negative value. The arrow shown in FIG. 2 faces the rear of the vehicle VH (in the negative x-axis direction), and this arrow represents a negative longitudinal force. That is, the longitudinal forces Fx1, Fx2, Fx3 and Fx4 acting on the left front wheel FL, the right front wheel FR, the left rear wheel RL and the right rear wheel RR shown in FIG. 2 are all braking forces.

In the embodiment, a "difference in the longitudinal force $\Delta Fx$" indicating a difference between the longitudinal force acting on the left wheels (i.e., the left front wheel FL and the left rear wheel RL) of the vehicle VH and the longitudinal force acting on the right wheels (i.e., the right front wheel FR and the right rear wheel RR) of the vehicle VH is calculated in the ECU 10. In addition, based on the difference in the longitudinal force $\Delta Fx$, correction amounts (hereinafter also referred to as "correcting longitudinal forces") $\Delta Fx1$, $\Delta Fx2$, $\Delta Fx3$, and $\Delta Fx4$ of the longitudinal force acting on the wheels of the vehicle VH are calculated.

After the correcting longitudinal forces $\Delta Fx1$, $\Delta Fx2$, $\Delta Fx3$, and $\Delta Fx4$ are calculated, the longitudinal forces acting on the wheels are corrected based on the correcting longitudinal forces. Then, the driving force distribution unit 30 is controlled based on the drive command values corresponding to the corrected longitudinal forces (Fx1+$\Delta Fx1$, Fx2+$\Delta Fx2$, Fx3+$\Delta Fx3$, and Fx4+$\Delta Fx4$). Alternatively, the ECB 60 is controlled based on the braking command values respectively corresponding to the corrected longitudinal forces.

When correcting the longitudinal forces, it is desirable to adjust the corrected longitudinal force $\Sigma Fxi + \Delta Fxi$ such that the sum $\Sigma Fxi$ of the longitudinal force before the correction and the sum $\Sigma(Fxi+\Delta Fxi)$ (i=1 to 4) of the longitudinal force after the correction are equal to each other. The fact that the total sum of the longitudinal force is equal before and after the correction means that the total sum of the longitudinal force does not change before and after the correction. Therefore, it is possible to control the driving force distribution unit 30 or the ECB 60 while suppressing a change in acceleration or deceleration of the vehicle VH due to the correction of the longitudinal force.

2-2. Configuration Example of ECU 10

Figure 3:
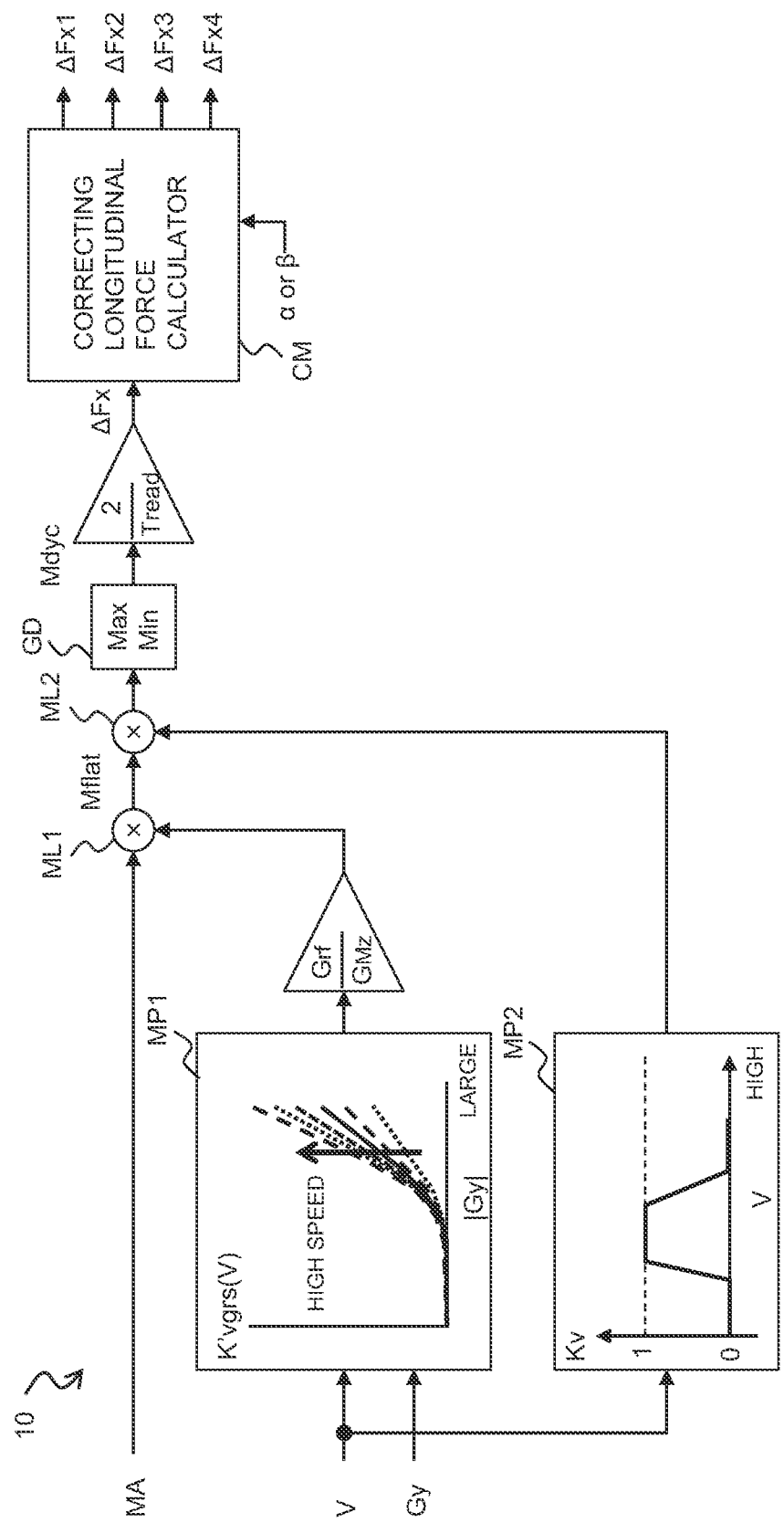
FIG. 3 is a diagram illustrating an example of a control block of an ECU for calculating a difference in a longitudinal force acting on left wheels of the vehicle and that acting on right wheels of the vehicle (a difference in the longitudinal force), and a correcting force (a correcting longitudinal force) acting on each wheel of the vehicle.

FIG. 3 shows an example of control blocks of the ECU 10 for calculating the difference in the longitudinal force and the correcting longitudinal forces. In the example shown in FIG. 3, the steering wheel angle MA, the vehicle speed V and the lateral acceleration Gy are used as input parameters for calculating the difference in the longitudinal force and the correcting longitudinal forces. Among the input parameters, the vehicle speed V and the lateral acceleration Gy are input to a control map MP1. The vehicle speed V is also input to a control map MP2.

The control map MP1 is a map that defines a relationship between a combination of the absolute value |Gy| of the lateral acceleration Gy and the vehicle speed V and a speed increasing ratio of the front wheel steering angle K'vgrs (V) for changing the overall steering ratio. FIG. 3 shows a relationship in which the speed increasing ratio K'vgrs increases as the absolute value |Gy| increases and the speed increasing ratio K'vgrs (V) increases as the vehicle speed V increases. The control map MP1 is preset based on the relationship shown in FIG. 3 and is stored in the memory of the ECU 10. A setting method of the control map MP1 will be described later.

The speed increasing ratio K'vgrs (V) obtained by referring to the control map MP1 is multiplied by Grf/GMZ and then output to a multiplier ML1. Grf/GMZ will be described later.

The control map MP2 is a gain map that defines a relationship between the vehicle speed V and a vehicle speed gain Kv. Similar to the control map MP1, the control map MP2 is preset and stored in the memory of the ECU 10. FIG. 3 illustrates a relationship in which the vehicle speed gain Kv is 0 in the low and high speed regions, the vehicle speed gain Kv increases from 0 to 1 in the medium speed region on the low speed region side, and decreases again from 1 to 0 in the medium speed region on the high speed region side.

Note that the control map MP2 is designed for the purpose of canceling the calculation of the difference in the longitudinal force ΔFx in the speed range excluding the low and high speed ranges. Therefore, when the difference in the longitudinal force ΔFx is calculated over the entire speed range, the vehicle speed gain Kv may not be calculated using the control map MP2.

Figure 4:
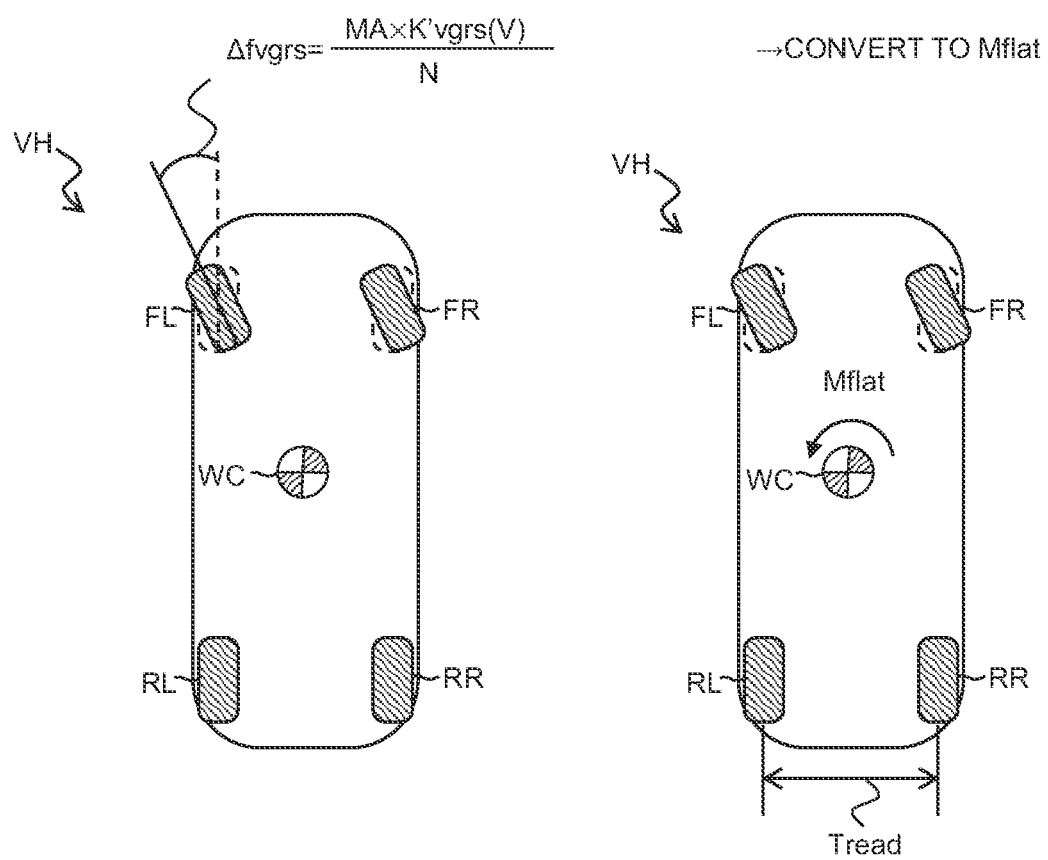
FIG. 4 is a diagram illustrating a concept of a conversion of a front wheel steering angle into a yaw moment generated around a weighted center of the vehicle using a speed increasing angle element.

In the multiplier ML1, a yaw moment Mflat generated around a weighted center WC of the vehicle VH is calculated. The yaw moment Mflat is obtained by conversion of the front wheel steering angle using the speed increasing angle element Δfvgrs. FIG. 4 is a diagram illustrating a concept of converting the front wheel steering angle into the yaw moment Mflat using the speed increasing angle element Δfvgrs. The speed increasing angle element Δfvgrs is shown leftward in FIG. 4, and the yaw moment Mflat is shown rightward in FIG. 4. The speed increasing angle element Δfvgrs is represented by following equation (1), and the yaw moment Mflat is represented by following equation (2).

[Equation 1]
$$\Delta fvgrs = \frac{MA * K'_{vgrs}(V)}{N} \quad (1)$$

[Equation 2]
$$M_{flat} = \frac{\Delta Fx * \text{Tread}}{2} \quad (2)$$

In the equation (1), N represents an overall steering ratio. In the equation (2), Tread is a distance between the left and right wheels (see FIG. 4). The difference in the longitudinal force ΔFx is represented by following equation (3).

[Equation 3]
$$\Delta Fx = (Fx2 + Fx4) - (Fx1 + Fx3) \quad (3)$$

It is assumed that means shown in leftward in FIG. 4 is means A for amplifying the front wheel steering angle amplifying the front wheel steering angle, and means shown in rightward in FIG. 4 is means B for securing the effectiveness of the rudder by adding the yaw moment around the weighted center WC. The yaw rate YR_A generated by the means A and the yaw rate YR_B generated by the means B are represented by following equations (4) and (5).

[Equation 4]
$$YR_A = \frac{1}{1 + K_h V^2} \frac{V}{l*N}(1 + K'_{vgrs}(V))MA \quad (4)$$

[Equation 5]
$$YR_B = \frac{1}{1 + K_h V^2} \frac{V}{l*N} MA + \frac{(K_f + K_r)}{2l^2 K_f K_r (1 + K_h V^2)} M_{flat} \quad (5)$$

In the equations (4) and (5), Kh represents a stability factor near the steering wheel angle 0, l represents a wheel base, Kf represents a front wheel equivalent cornering power near the steering wheel angle 0, and Kr represents a rear wheel equivalent cornering power near the steering wheel angle 0.

When the equations (4) and (5) are arranged on the assumption that yaw rate YR_A is equal to yaw rate YR_B, following equation (6) representing the yaw moment Mflat is derived.

[Equation 6]
$$M_{flat} = \frac{G_{rf}}{G_{Mz}} K'_{vgrs}(V) * MA \quad (6)$$

$$G_{rf} = \frac{1}{1 + K_h V^2} \frac{V}{l*N}$$

$$G_{Mz} = \frac{(K_f + K_r)}{2l^2 K_f K_r (1 + K_h V^2)}$$

In the multiplier ML1, the speed increasing ratio K'vgrs (V) multiplied by Grf/GMZ is further multiplied by the steering wheel angle MA (i.e., the equation (6)), thereby calculating the yaw moment Mflat.

The yaw moment Mflat output from the multiplier ML1 is input to a multiplier ML2. In the multiplier ML2, the yaw moment Mflat is multiplied by the vehicle speed gain Kv obtained by referring to the control map MP2. The yaw moment Mflat multiplied by the vehicle speed gain Kv is input to a constrainer GD. When the vehicle speed gain Kv is not calculated, the yaw moment Mflat output from the multiplier ML1 is input to the constrainer GD as it is.

In the constrainer GD, the following equation (7) is used to treat the upper and lower limits of the yaw moment Mflat output from the multiplier ML2. Thus, the yaw moment Mdyc generated around the weighted center WC by the behavior control of the vehicle VH is calculated.

[Equation 7]
$$M_{dyc} = \text{Max,Min}[M_{flat} * K_v] \quad (7)$$

The yaw moment Mdyc output from the constrainer GD is converted into the difference in the longitudinal force ΔFx by following equation (8).

[Equation 8]
$$\Delta Fx = \frac{2}{\text{Tread}} M_{dyc} \quad (8)$$

The correcting longitudinal forces ΔFx1, ΔFx2, ΔFx3, and ΔFx4 are calculated using the difference in the longitudinal force ΔFx determined by the equation (8). A correcting longitudinal force calculator CM calculates the correcting longitudinal forces ΔFx1, ΔFx2, ΔFx3, and ΔFx4 by following equations (9) to (12) using the distribution ratio α

(for example, 50:50) of the driving force between the left front wheel FL and the right front wheel FR, for example.

[Equation 9]
$$\Delta Fx1 = -\alpha * \Delta Fx/2 \quad (9)$$

[Equation 10]
$$\Delta Fx2 = \alpha * \Delta Fx/2 \quad (10)$$

[Equation 11]
$$\Delta Fx3 = -(1-\alpha) * \Delta Fx/2 \quad (11)$$

[Equation 12]
$$\Delta Fx4 = (1-\alpha) * \Delta Fx/2 \quad (12)$$

In another example, as the correcting longitudinal force calculator CM, the correcting longitudinal forces ΔFx1, ΔFx2, ΔFx3, and ΔFx4 are calculated by following equations (13) to (16) or following equations (17) to (20) using a distribution ratio β (e.g., 50:50) of the braking force at the left front wheel FL and the right front wheel FR.

(i) When the vehicle VH is counter-clockwise turning

[Equation 13]
$$\Delta Fx1 = -\beta * \Delta Fx \quad (13)$$

[Equation 14]
$$\Delta Fx2 = 0 \quad (14)$$

[Equation 15]
$$\Delta Fx3 = -(1-\beta) * \Delta Fx \quad (15)$$

[Equation 16]
$$\Delta Fx4 = 0 \quad (16)$$

(ii) When the vehicle VH is turning clockwise

[Equation 17]
$$\Delta Fx1 = 0 \quad (17)$$

[Equation 18]
$$\Delta Fx2 = \beta * \Delta Fx \quad (18)$$

[Equation 19]
$$\Delta Fx3 = 0 \quad (19)$$

[Equation 20]
$$\Delta Fx4 = (1-\beta) * \Delta Fx \quad (20)$$

The correcting longitudinal forces ΔFx1, ΔFx2, ΔFx3, and ΔFx4 are used to correct the longitudinal force acting on each wheel. When drive command values corresponding to the corrected longitudinal forces (Fx1+ΔFx1, Fx2+ΔFx2, Fx3+ΔFx3, and Fx4+ΔFx4) are generated, the driving force distribution unit 30 is controlled based on the drive command values. Alternatively, when braking command values corresponding to the corrected longitudinal forces are generated, the ECB 60 is controlled based on the braking command values.

2-2. Setting Example of Control Map MP1

The control map MP1 is set by, for example, the following method. In this method, first, an index f(Gy) representing a relationship between the lateral acceleration and the steering effectiveness (ΔYR/ΔMA) is set for each set vehicle speed (step S1-1).

Figure 5:
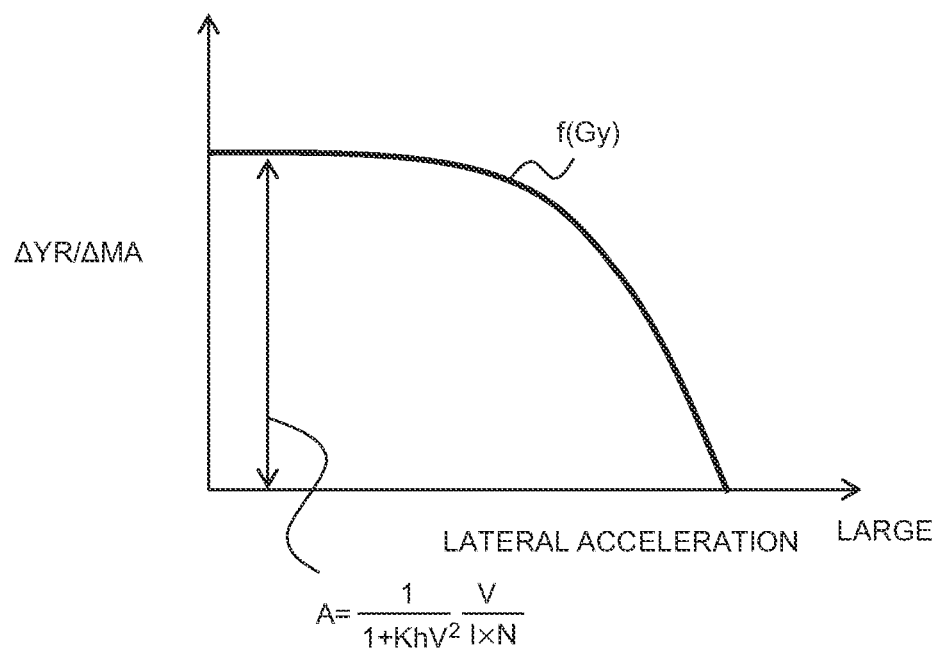
FIG. 5 is a diagram illustrating an example of an index representing a relationship between lateral acceleration and an effectiveness of a rudder.

FIG. 5 is a diagram showing an example of the index f(Gy). In the example shown in FIG. 5, the index f(Gy) is represented by following equation (21).

[Equation 21]
$$f(Gy) = \frac{1}{1 + K_h V^2} \frac{V}{l * N} \quad (21)$$

In the equation (21), Kh represents a stability factor in the vicinity of steering wheel angle 0, l represents the wheel base, V represents the vehicle speed, and N represents the overall steering ratio.

Following step S1-1, the relationship between the lateral acceleration and the steering wheel angle is calculated (step S1-2).

First, the change ΔYR of the yaw rate with respect to the change ΔGy of the steering wheel angle can be transformed as shown in following equation (22).

[Equation 22]
$$\frac{\Delta YR}{\Delta Gy} = \frac{\Delta YR}{\Delta YR * V} = \frac{1}{V} \quad (22)$$

When the left side of Equation (22) is divided by the steering effectiveness (ΔYR/ΔMA) and transformed, following equation (23) representing the relationship between the lateral acceleration Gv and the steering wheel angle MA is obtained.

[Equation 23]
$$\frac{\frac{\Delta YR}{\Delta Gy}}{\frac{\Delta YR}{\Delta MA}} = \frac{\Delta MA}{\Delta Gy} = \frac{1}{V * f(Gy)} \rightarrow MA = \int \frac{1}{V * f(Gy)} \Delta Gy \quad (23)$$

Figure 6:
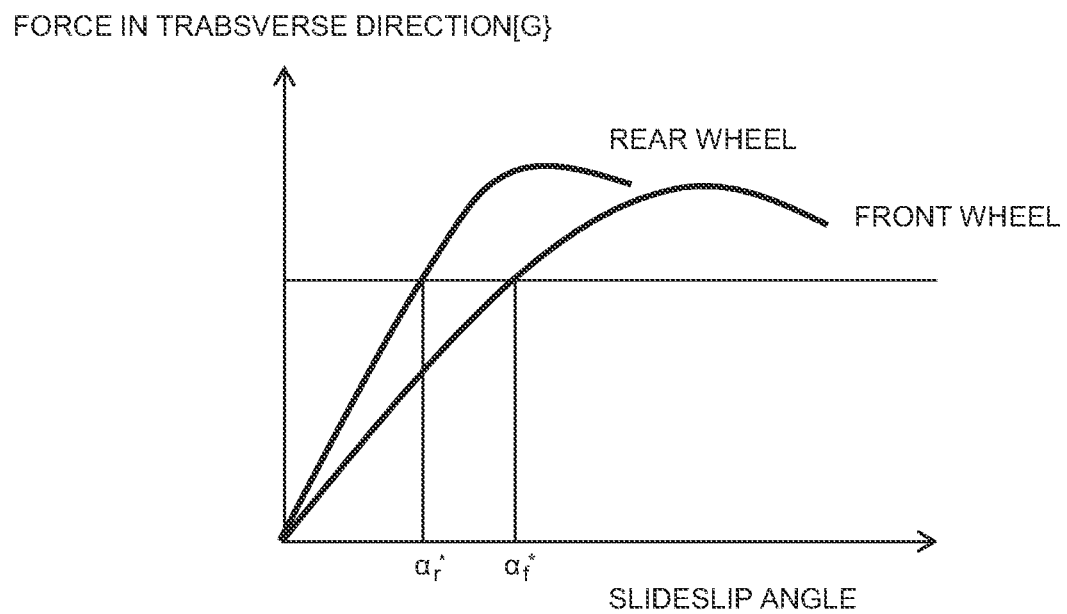
FIG. 6 is a diagram illustrating an example of a relationship between a sideslip angle and a force in a transverse direction.

Following Step S1-2, sideslip angles αf* and αr* of front and rear wheels required when a force in the transverse direction is generated are calculated for each lateral acceleration (Step S1-3). FIG. 6 is a diagram showing an example of the relationship between the sideslip angle and the force in the transverse direction. The characteristics shown in FIG. 6 can be calculated from general tire specifications such as a cornering power and a maximum lateral friction coefficient and a change in the steering angle of the front and rear wheels (cornering compliance characteristics) with respect to each lateral acceleration using a typical tire model (for example, magic formula).

Following step S1-3, a speed increasing ratio K'vgrs (V) at which the combination of sideslip angles when a force in the transverse direction is generated becomes sideslip angles αf and αr* in the combination of the specified steering wheel angle and lateral acceleration is calculated (step S1-4).

The sideslip angles αf* and αr* are expressed by equations (24) and (25) using the lengths lf and lr from the weighted center of the vehicle to the front and rear wheels and the sideslip angle β at the position of the weighted center.

[Equation 24]

$$-\alpha_f^* = \beta + \frac{l_f}{V^2}Gy - \frac{(1 + K'_{vgrs}(V))MA}{N} \quad (24)$$

[Equation 25]

$$-\alpha_r^* = \beta - \frac{l_r}{V^2}Gy \quad (25)$$

By eliminating β from the equations (24) and (25) and rearranging them, the equation (26) expressing a relationship between the lateral acceleration Gy and the speed increasing ratio K'vgrs (V) is obtained (where lf+lr=1).

[Equation 26]

$$K'_{vgrs}(V) = \frac{N}{MA}\left(\alpha_f^* - \alpha_r^* + \frac{l}{V^2}Gy\right) - 1 \quad (26)$$

Following step S1-4, at step S1-5, the speed increasing ratio K'vgrs (V) for the combination of the absolute value of lateral acceleration Gy and the vehicle speed V is calculated based on equation (23) obtained at step S1-2 and equation (26) obtained at step S1-4. Then, the control map MP1 is set by combining the calculated speed increasing ratio K'vgrs (V) and the combination of the absolute value |Gy| of the lateral acceleration Gy and the vehicle speed V.

Here, the index f(Gy) which is a variable of the equation (23) may be set in advance or may be set by the driver of the vehicle VH. In the former case, the control map MP1 is set at the time of vehicle shipment. The control map MP1 in the latter case can be set by performing the calculation of step S1-5 based on the indicator f(Gy) set by the driver off-line (for example, while the vehicle VH is stopped).

3. Effect

According to the embodiment described above, the yaw moment Mflat generated around the center of gravity WC of the vehicle VH is calculated based on the speed increasing ratio K'vgrs (V) calculated using the control map MP1 and the steering wheel angle MA. In addition, based on the yaw moment Mflat, a yaw moment Mdyc generated around the weighted center WC by behavior control of the vehicle VH is calculated. Then, the correcting longitudinal force of each wheel of the vehicle VH is calculated so as to realize the difference in the longitudinal force ΔFx calculated based on the yaw moment Mdyc.

As described above, the control map MP1 defines the relationship between the combination of the absolute value |Gy| of the lateral acceleration Gy and the vehicle speed V and the speed increasing ratio K'vgrs (V). Therefore, if there is information on the lateral acceleration Gy and the vehicle speed V, the speed increasing ratio K'vgrs (V) can be calculated, and the correcting longitudinal forces and the like can be calculated based on the speed increasing ratio K'vgrs (V) and the steering wheel angle MA. Therefore, according to the embodiment in which the control map MP1 is used, it is possible to appropriately adjust the longitudinal force of each wheel even in a scene in which the lateral acceleration is large, and to suppress a decrease in the effectiveness of the rudder.

Figure 7:
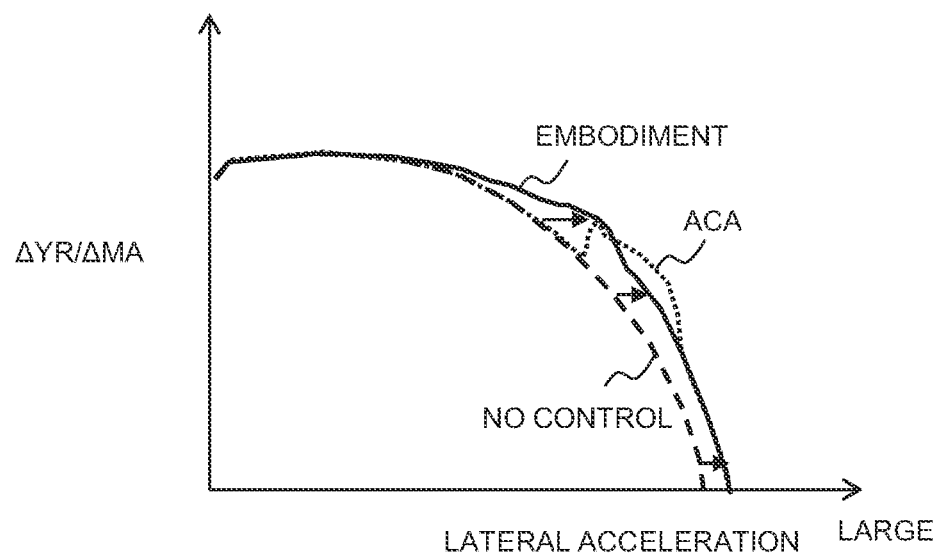
FIG. 7 is a diagram illustrating an effect according to the embodiment.

FIG. 7 is a diagram illustrating an effect according to the embodiment. FIG. 7 shows a verification result of the steering effectiveness (ΔYR/ΔMA) at the vehicle speed 63 km/h. "No control" shown in FIG. 7 is a first comparative example of the embodiment and corresponds to performance in a case where the behavior control according to the embodiment is not performed. "ACA" is a second comparative example of the embodiment and corresponds to a performance when active cornering assist control is performed.

As shown in FIG. 7, the performance of the "ACA" is improved even in a region where the lateral acceleration is large compared to the "no control". This is because the active cornering assist control (ACA control) is executed in the region where the lateral acceleration is large. This tendency is also observed in the comparison between the "embodiment" and the "no control". In addition to this, in the "embodiment", the performance is improved even in a moderate region as compared with the "no control" and the "ACA". This result indicates that performance is expected to be improved in a wide lateral acceleration region by performing behavior control according to the embodiment.

4. Other Embodiments 4-1. Another Calculation Example of Speed Increasing Ratio K'vgrs (V)

Figure 8:
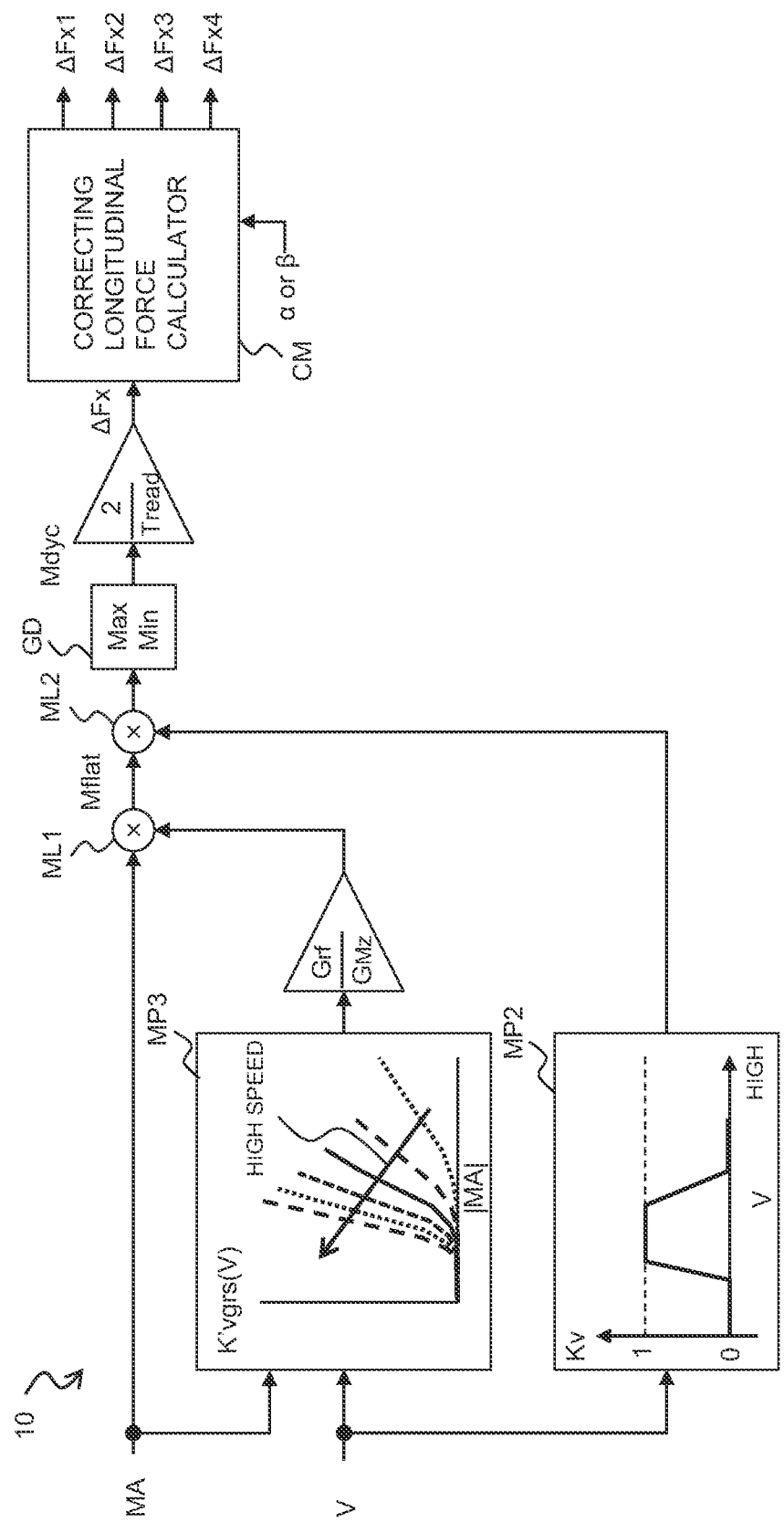
FIG. 8 is a diagram illustrating another example of a control block of the ECU.

FIG. 8 shows another example of control blocks of the ECU 10 for calculating the difference in the longitudinal force and the correcting longitudinal forces. Most of the control blocks shown in FIG. 8 are common to those shown in FIG. 3. The difference between them is the control map for calculating the speed increasing ratio K'vgrs (V). That is, although the speed increasing ratio K'vgrs (V) is calculated based on the control map MP1 in the example shown in FIG. 3, the speed increasing ratio K'vgrs (V) is calculated based on a control map MP3 in the example shown in FIG. 8. The control map MP1 corresponds to a "preset control map" and a "first control map" of the present disclosure. On the other hand, the control map MP3 corresponds to the "preset control map" and the "second control map" of the present disclosure.

The control map MP3 is a map that defines a relationship between the combination of the steering wheel angle MA and the vehicle speed V, and the speed increasing ratio K'vgrs (V). FIG. 8 shows a relationship in which the speed increasing ratio K'vgrs increases as the steering wheel angle MA increases and the speed increasing ratio K'vgrs (V) increases as the vehicle speed V increases. The control map MP3 is set in advance based on the relationship shown in FIG. 8 and stored in the memory of the ECU 10.

The setting method of the control map MP3 is basically the same as that of the control map MP1. However, when the control map MP3 is set, the speed increasing ratio K'vgrs (V) for the combination of the steering wheel angle and the vehicle speed V is calculated based on the equation (23) representing the relationship between the lateral acceleration Gy and the steering wheel angle MA and the equation (26) representing the relationship between the lateral acceleration Gy and the speed increasing ratio K'vgrs (V). The control map MP3 is set by combining the calculated speed increasing ratio K'vgrs (V) and the combination of the absolute value of the lateral acceleration Gy and the vehicle speed V.

When the control map MP3 is used, the steering wheel angle MA and the vehicle speed V among the input parameters are input to the control map MP3. That is, in the example shown in FIG. 8, the speed increasing ratio K'vgrs (V) is calculated without using the lateral acceleration Gy. Thus, according to the example shown in FIG. 8, the speed increasing ratio K'vgrs (V) can be calculated without detecting or estimating the lateral acceleration Gy. In addition, it is possible to obtain the same effects as those obtained by the above-described embodiment.

4-2. Another Calculation Example of Yaw Moment Mdyc

Figure 9:
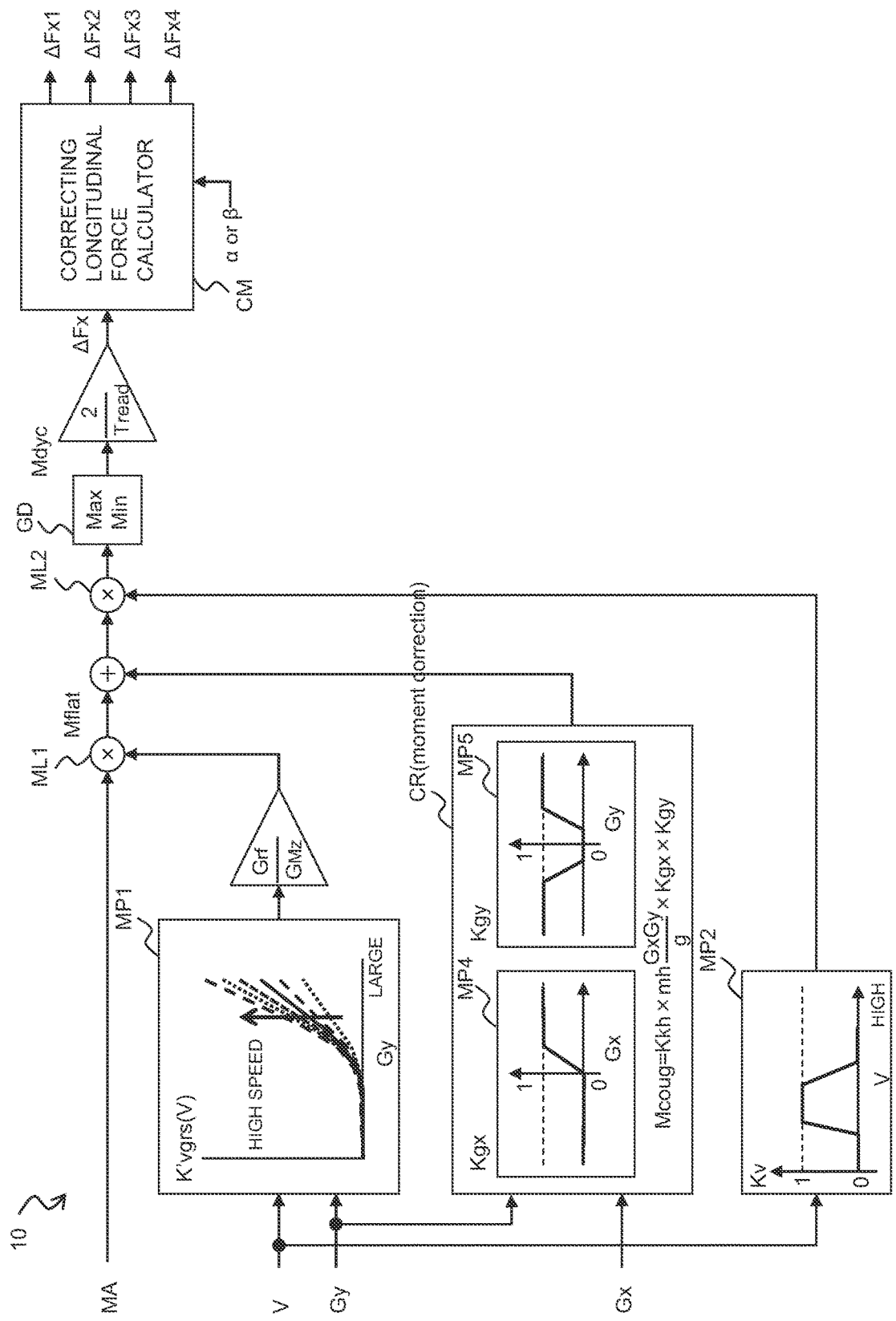
FIG. 9 is a diagram illustrating still another example of the control block of the ECU.

FIG. 9 illustrates yet another example of control blocks of the ECU 10 for calculating the difference in the longitudinal force and the correcting longitudinal forces. Most of the control blocks shown in FIG. 9 are common to those shown in FIG. 3. The difference between the two is the presence or absence of a calculator CR for calculating a yaw moment Mcogh. The yaw moment Mcogh is a yaw moment (yaw moment correction amount) for canceling a yaw moment generated during acceleration or deceleration of the vehicle VH.

The calculator CR includes control maps MP4 and MP5. The control map MP4 is a gain map that defines a relationship between the longitudinal acceleration Gx and the gain Kgx. The control map MP5 is a gain map that defines a relationship between the lateral acceleration Gy and the acceleration gain Kgy. Like the control map MP1, the control map MP4 and the MP5 are preset and stored in the memory of the ECU 10. In the example shown in FIG. 9, a relationship in which the gain increases from Kgx0 to 1 at the time of longitudinal acceleration is drawn in the control map MP4. In addition, a relationship in which the gain increases from Kgy0 to 1 at the time of acceleration in the horizontal direction is depicted in the control map MP5.

The control map MP4 corresponds to the "predetermined control gain map" and the "first control gain map" of the present disclosure. On the other hand, the control map MP5 corresponds to the "predetermined control gain map" and the "second control gain map" of the present disclosure.

The calculator CR calculates the yaw moment Mcogh according to the following equation (27) which is expressed using the yaw moment (−mHGxGy/g) generated during acceleration or deceleration of the vehicle VH.

[Equation 27]

$$M_{cogh} = K_{kh} \times mH \frac{G_x G_y}{g} \times K_{gx} \times K_{gy} \quad (27)$$

In the equation (27), Kkh represents a control gain indicating a degree of canceling the yaw moment (−mHGxGy/g). When the control gain Kkh is 1, the yaw moment (−mHGxGy/g) is canceled by 100%, and when the control gain Kkh is 0, the yaw moment (−mHGxGy/g) is not canceled.

When the yaw moment Mcogh is calculated, the yaw moment Mcogh is added to the yaw moment Mflat output from the multiplier ML1, and then input to the multiplier ML2. At the multiplier ML2, the yaw moment Mflat to which the yaw moment Mcogh has been added is multiplied by the vehicle speed gain Kv and then input to the constrainer GD. When the vehicle speed gain Kv is not calculated, the yaw moment Mflat to which the yaw moment Mcogh is added is input to the constrainer GD.

Thus, in the example shown in FIG. 9, the yaw moment Mdyc is calculated according to following equation (28).

[Equation 28]

$$M_{dyc} = \text{Max,Min}[M_{flat} + M_{cogh}] * K_v] \quad (28)$$

The processing after the yaw moment Mdyc is calculated is the same as the processing described with reference to FIG. 3. As described above, according to the example shown in FIG. 9, when the vehicle VH is accelerated or decelerated, the yaw moment generated at the time of acceleration or deceleration can be canceled out to improve the steering performance.

4-3. Adjustment Example of Distribution Ratios α and β

Figure 10:
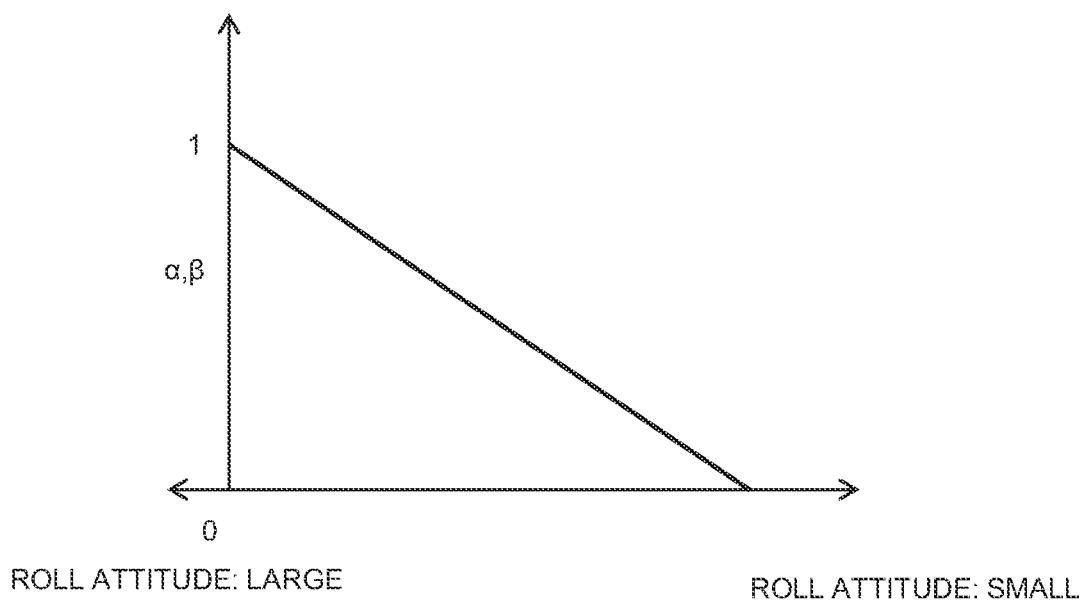
FIG. 10 is a diagram illustrating an example of changing a distribution ratio of a driving force or a braking force in consideration of a roll posture of the vehicle.

In the embodiment, each of the distribution ratios α and β is set to a predetermined distribution ratio (e.g., 0.5). However, when it is desired to suppress roll (rotational behavior) of the vehicle VH during turning, the distribution ratios α and β may be changed to values smaller than the predetermined distribution ratio. FIG. 10 is a diagram illustrating a modification example of the distribution ratios α and β in consideration of the roll attitude. As shown in FIG. 10, as the values of the distribution ratios α and β increase, a roll attitude increases, and as the values thereof decrease, the roll attitude decreases. This is because when a braking force or a driving force is applied to the front and rear wheels, a force that promotes rolling acts on the front wheel side and a force that suppresses rolling acts on the rear wheel side.

In this regard, if the distribution ratios α and β are set to values (excluding 0) smaller than the predetermined distribution ratio, the braking force or the driving force can be more distributed to the rear wheels to suppress the roll of the vehicle VH during turning.

Figure 11:
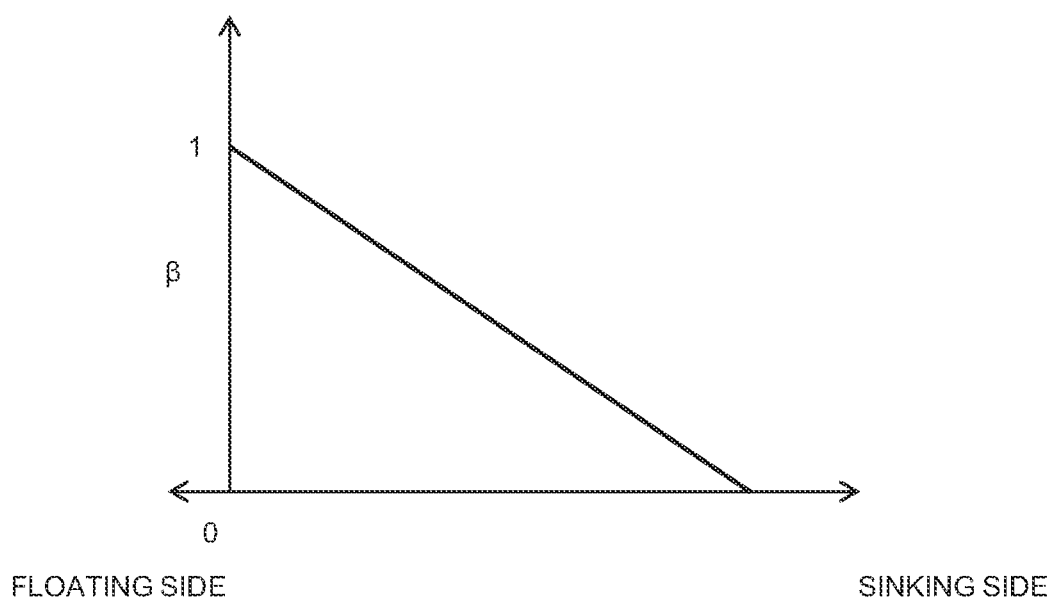
FIG. 11 is a diagram illustrating an example of changing the distribution ratio of the braking force in consideration of a floating posture of the vehicle.

When it is desired to suppress a floating of the vehicle VH during deceleration turning, the distribution ratio β may be changed to a value smaller than the predetermined distribution ratio. FIG. 11a is a diagram illustrating a modification example of the distribution ratio β in consideration of a floating posture of the vehicle VH. As shown in FIG. 11, as the value of the distribution ratio β increases, the vehicle VH is set to the sinking side posture, and as the value of the distribution ratio β decreases, the vehicle VH is set to the floating side posture. Therefore, if the distribution ratio β is set to a value (excluding 0) smaller than the predetermined distribution ratio, it is possible to reduce the share of the braking force by the front wheels and to suppress the floating of the vehicle VH during the deceleration turning.

What is claimed is:

1. A method for controlling behavior of a vehicle, the method comprising the steps of:
   obtaining a difference in a longitudinal force indicating a difference between the longitudinal force acting on left wheels and the longitudinal force acting on right wheels based on an input parameter; and
   calculating a correction amount of the longitudinal force acting on each wheel based on the difference in the longitudinal force to independently control each wheel,
   wherein the step of obtaining the difference in the longitudinal force comprises the steps of:

calculating a speed increasing ratio of a front wheel steering angle for changing an overall steering ratio based on a preset control map and the speed and lateral acceleration of the vehicle or the speed and steering wheel angle of the vehicle as the input parameter;

calculating a yaw moment to be generated around a weighted center of the vehicle based on the speed increasing ratio and the steering wheel angle of the vehicle as the input parameter; and calculating the difference in the longitudinal force based on the yaw moment, wherein the correction amount of the longitudinal force is calculated for each wheel using the difference in the longitudinal force and a driving force distribution ratio in front wheels of the vehicle, and the vehicle is configured to control a driving force applied to each wheel of the vehicle based on the correction amount.

2. The method according to claim 1,
wherein the preset control map includes a first or a second control map,
  wherein the first control map defines a relationship between a speed and a lateral acceleration and a speed increasing ratio of a front wheel steering angle for changing the overall steering ratio, and the second control map defines a relationship between a steering wheel angle and a speed and a speed increasing ratio of a front wheel steering angle for changing the overall steering ratio, and
wherein, when the preset control map is the first control map, in the step of calculating the speed increasing ratio, the first control map and the speed and lateral acceleration of the vehicle as the input parameters are used to calculate the speed increasing ratio, and
wherein, when the preset control map is the second control map, in the step of calculating the speed increasing ratio, the second control map and a steering wheel angle and a speed of the vehicle as the input parameters are used to calculate the speed increasing ratio.

3. The method according to claim 2,
wherein the relationship in the first control map includes a relationship in which the speed increasing ratio of the front wheel steering angle for changing the overall steering ratio increases as the lateral acceleration increases, and the relationship in the second control map includes a relationship in which the speed increasing ratio of the front wheel steering angle for changing the overall steering ratio increases as the steering wheel angle increases.

4. The method according to claim 1,
wherein the input parameter further includes a longitudinal acceleration of the vehicle,
wherein, the step of obtaining the difference in the longitudinal force further comprises the steps of:
calculating a yaw moment generated during acceleration or deceleration of the vehicle based on a predetermined control gain map and a lateral acceleration and a longitudinal acceleration of the vehicle as the input parameter;
calculating a yaw moment correction amount for canceling a yaw moment generated during acceleration or deceleration of the vehicle based on the yaw moment; and
correcting the yaw moment calculated in the step of calculating the yaw moment by using the yaw moment correction amount before the step of calculating the difference in the longitudinal force.

5. The method according to claim 4,
wherein the predetermined control gain map includes a first or a second control gain map,
  wherein, in the first control gain map, a relationship between the longitudinal acceleration and a first control gain is defined, and in the second control gain map, a relationship between the lateral acceleration and a second control gain is defined,
wherein the yaw moment correction amount is calculated based on a control gain indicating a degree of cancellation of a yaw moment generated during acceleration or deceleration of the vehicle, a first control gain calculated based on the first control gain map and the longitudinal acceleration of the vehicle, and a second control gain calculated based on the second control gain map and the lateral acceleration of the vehicle.

6. The method according to claim 1,
wherein the step of obtaining the difference in the longitudinal force further comprises the steps of:
calculating a control gain in accordance with a speed of the vehicle based on a predetermined control gain map defining a relationship between a speed and a control gain and a speed of the vehicle as the input parameter; and
correcting the yaw moment calculated in the step of calculating the yaw moment using the control gain before the step of calculating the difference in the longitudinal force.

7. A device for controlling a behavior of a vehicle, comprising:
a processor; and
a memory in which a control program is stored,
when the control program is executed, the processor is configured to:
obtain a difference in a longitudinal force indicating a difference between the longitudinal force acting on left wheels and the longitudinal force acting on right wheels based on an input parameter; and
calculate a correction amount of the longitudinal force acting on each wheel based on the difference in the longitudinal force to independently control each wheel,
wherein, in the processing to obtain the difference in the longitudinal force, the processor is configured to:
calculate a speed increasing ratio of front wheel steering angle for changing an overall steering ratio based on a preset control map and the speed and lateral acceleration of the vehicle, or based on the preset control map and the speed and steering wheel angle of the vehicle as the input parameter;
calculate a yaw moment to be generated around a weighted center of the vehicle based on the speed increasing ratio and the steering wheel angle of the vehicle as the input parameter; and
calculate the difference in the longitudinal force based on the yaw moment,
wherein the correction amount of the longitudinal force is calculated for each wheel using the difference in the longitudinal force and a driving force distribution ratio in front wheels of the vehicle; and
control a driving force applied to each wheel of the vehicle based on the correction amount.

8. A device for controlling a behavior of a vehicle, comprising:
a processor; and
a memory in which a control program is stored, when the control program is executed, the processor is configured to:

obtain a difference in a longitudinal force indicating a difference between the longitudinal force acting on left wheels and the longitudinal force acting on right wheels based on an input parameter; and calculate a correction amount of the longitudinal force acting on each wheel based on the difference in the longitudinal force to independently control each wheel, wherein, in the processing to obtain the difference in the longitudinal force, the processor is configured to:

calculate a speed increasing ratio of front wheel steering angle for changing an overall steering ratio based on a preset control map and the speed and lateral acceleration of the vehicle, or based on the preset control map and the speed and steering wheel angle of the vehicle as the input parameter;

calculate a yaw moment to be generated around a weighted center of the vehicle based on the speed increasing ratio and the steering wheel angle of the vehicle as the input parameter;

calculate the difference in the longitudinal force based on the yaw moment;

wherein the correction amount of the longitudinal force is calculated for each wheel by using the difference in the longitudinal force and a braking force distribution ratio in a front wheel on a turning direction side of the vehicle; and control a braking force applied to each wheel of the vehicle based on the correction amount.

* * * * *